SUBSCRIPTION TELEVISION SYSTEM

Filed July 8, 1953 4 Sheets-Sheet 1

ERWIN M. ROSCHKE
*INVENTOR.*

BY *Francis W. Crotty*

HIS ATTORNEY.

ERWIN M. ROSCHKE
*INVENTOR.*

BY *Francis W. Crotty*

HIS ATTORNEY.

INVENTOR.
ERWIN M. ROSCHKE
BY Francis W. Crotty
HIS ATTORNEY.

SUBSCRIPTION TELEVISION SYSTEM

Filed July 8, 1953 4 Sheets-Sheet 4

ERWIN M. ROSCHKE
INVENTOR.
BY Francis W. Crotty
HIS ATTORNEY.

2,852,598

SUBSCRIPTION TELEVISION SYSTEM

Erwin M. Roschke, Des Plaines, Ill., assignor to Zenith Radio Corporation, a corporation of Delaware Application July 8, 1953, Serial No. 366,727

16 Claims. (Cl. 178—5.1)

This invention relates to subscription television systems in which a television signal is distributed in coded form for use only in subscriber receivers having appropriate decoding apparatus actuated in accordance with the coding schedule of the telecast.

Since the invention may be practiced in either a transmitter or receiver, the term "encoding" is used herein in its generic sense to encompass either coding at the transmitter or decoding at the receiver.

Subscription television systems have been proposed in which a television signal is coded with a very high degree of complexity by varying the mode of translation at a faster-than-field rate; that is, the television signal is coded by altering some characteristic thereof at intervals occurring more frequently than the field-scaning intervals. A system of this type is disclosed and claimed in copending application Serial No. 291,714, filed June 4, 1952, in the name of Carl G. Eilers et al., entitled "Subscription Television System," and assigned to the present assignee. In accordance with one embodiment of that copending application, a counting or cycling mechanism is actuated by line-synchronizing pulses to develop a square-wave encoding signal having an amplitude excursion each time the mechanism registers a predetermined count, for example, after every 15 line-trace intervals. This encoding signal, in turn, actuates an encoding device to effect mode changes in the television system at a rate corresponding to the frequency of actuation. Further secrecy may be introduced by inverting the phase of the encoding signal, preferably at random times, and indicating the timing schedule of such phase reversals to subscriber receivers by means of a transmitted key signal, or otherwise. In order to ensure synchronous action between the encoding equipment at the subscription television transmitter and the various subscriber receivers, suitable reset signals are simultaneously applied to all such equipment for resetting or "locking-in" purposes.

In copending application Serial No. 310,309, filed September 18, 1952, in the name of Alexander Ellett, entitled "Subscriber Television System," and assigned to the present assignee, there is disclosed and claimed another subscription television system featuring a counting or cycling mechanism operated preferably at a faster-than-field rate to produce corresponding faster-than-field mode changes. More specifically, in that system a series of code-conveying signal pulses, transmitted at different carrier frequencies to facilitate their selection and segregation, is employed selectively to operate various stages of a multi-stage pulse counter, such as a binary counting chain. Preferably, at least certain of the code pulses occur with a random time pattern so that the effective count of the chain, which is actuated by such pulses, varies at an irregular rate. Mode changes occur in the television system each time the counting chain registers a predetermined count and in this manner the operating mode is changed at irregular or random intervals. As in the case of the aforementioned Eilers et al. application, reset signals preferably are utilized at the subscription television transmitter and various subscriber receivers to maintain the encoding systems in step. This may be accomplished by supplying certain ones of the code-conveying signal pulses, for example all such pulses having a preselected carrier frequency, to each one of the binary counters in the chain for establishing the system in a predetermined reference condition.

The present invention stems from the previous work of Eilers et al. and Ellett and concerns itself with the same general type of arrangement in that it employs a control or cycling mechanism, such as a counting circuit, having a sequence of operating steps for producing a control signal to effect mode changes. The invention effects very complex coding and provides a high degree of secrecy with a relatively simple arrangement of components characterized by the fact that the cycling mechanism is reset to a reference condition at any selected one of a plurality of different predetermined times during each one of a series of reset-time intervals. To accomplish this result, the cycling mechanism is "keyed" or "phased" by a preselected characteristic variation of a composite reset signal which may be developed, for example, during each field-retrace interval and which is preferably available only to authorized subscribers.

The present invention is further attractive in that a control signal produced by a mechanism which operates at a faster-than-field rate and which has its sequence of operating steps occasionally interrupted is very useful in adequately and effectively coding the audio portion of a television signal.

It is, accordingly, an object of the present invention to provide a new and improved subscription television system in which the subscription television signal is coded with a high degree of complexity.

It is another object of the invention to provide an improved and simplified encoding arrangement for a subscription television system of the general type disclosed by Eilers et al. and Ellett.

It is another object of the present invention to provide a new and improved subscription television system wherein mode changes are effected between at least two operating modes according to a periodically recurring pattern which is interrupted at randomly occurring spaced time intervals.

It is a further object of the present invention to provide an improved subscription television system which develops a highly complex coding signal that is particularly useful in coding the sound components of a television signal.

An additional object of the invention is to provide an improved encoding system for use at the transmitter and/or receiver of a subscription television system which may employ faster-than-field coding.

A subscription television system, constructed in accordance with the present invention, for translating a television signal comprising periodically recurring field-trace intervals and intervening field-retrace intervals includes an encoding device having at least two operating conditions each of which establishes a predetermined operating mode in the system effectively to encode the television signal. The system comprises a cycling mechanism having a sequence of operating steps for producing a control signal exhibiting a characteristic which periodically varies upon the completion of each sequence as between at least two predetermined values. Means are provided for developing during each of a series of spaced reset-time intervals, each short relative to one of the field-trace intervals, a composite reset signal having a characteristic that varies in accordance with a predetermined schedule. The system has means responsive to at least one selected variation of the composite reset signal during each of the reset-time intervals for developing a series of reset components and also means for applying each of these reset components to the cycling mechanism to effect actuation thereof to a predetermined reference condition thereby modifying the control signal. Finally, the subscription television system includes means coupling the cycling mechanism to the encoding device to effect actuation of that device in accordance with the modified control signal.

The features of this invention which are believed to be new are set forth with particularity in the appended claims. The invention, together with further objects and advantages thereof, may best be understood, however, by reference to the following description in conjunction with the accompanying drawings, in which:

Figure 1:
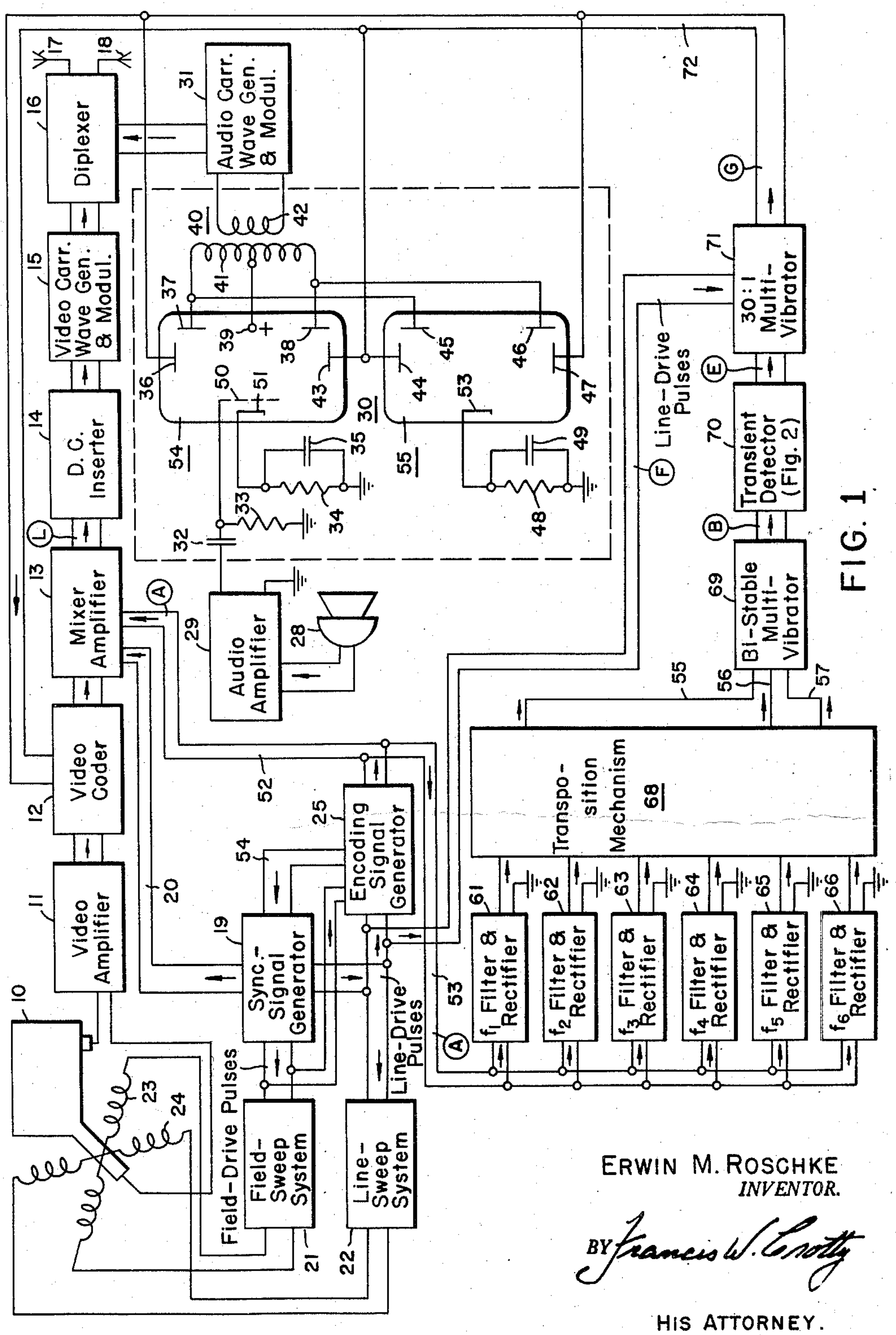
Figure 1 is a schematic representation of a subscription television transmitter constructed in accordance with the invention.
Figure 4:
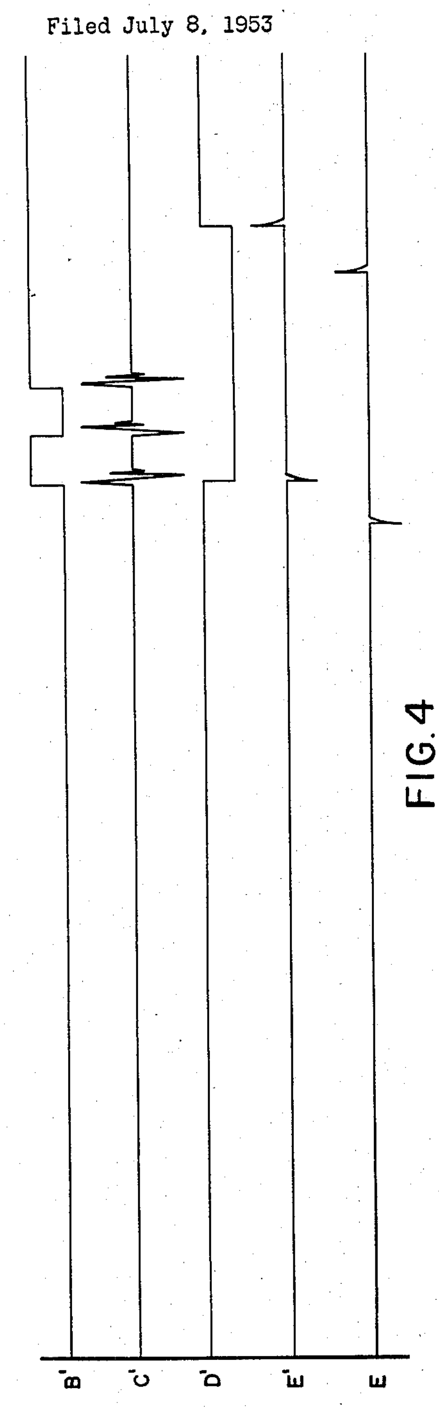
Figures 2, 5:
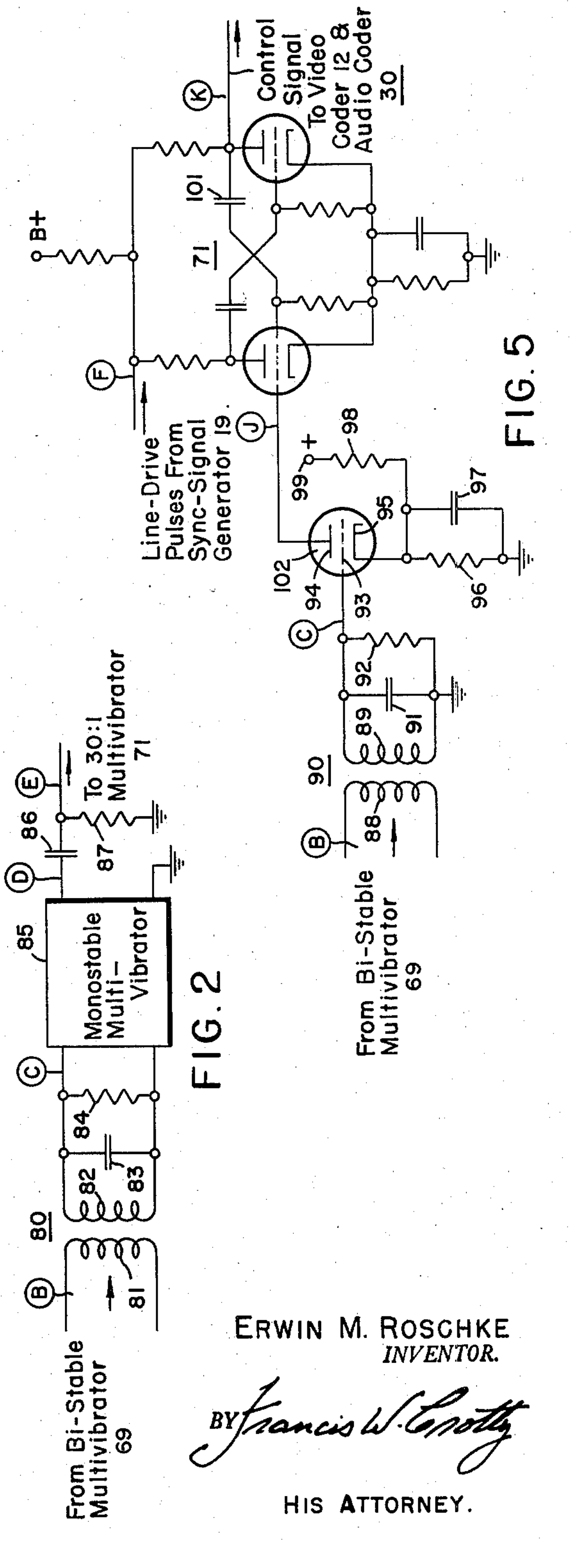
Figure 2 is a detailed schematic representation of a portion of the transmitter of Figure 1.
Figure 3:
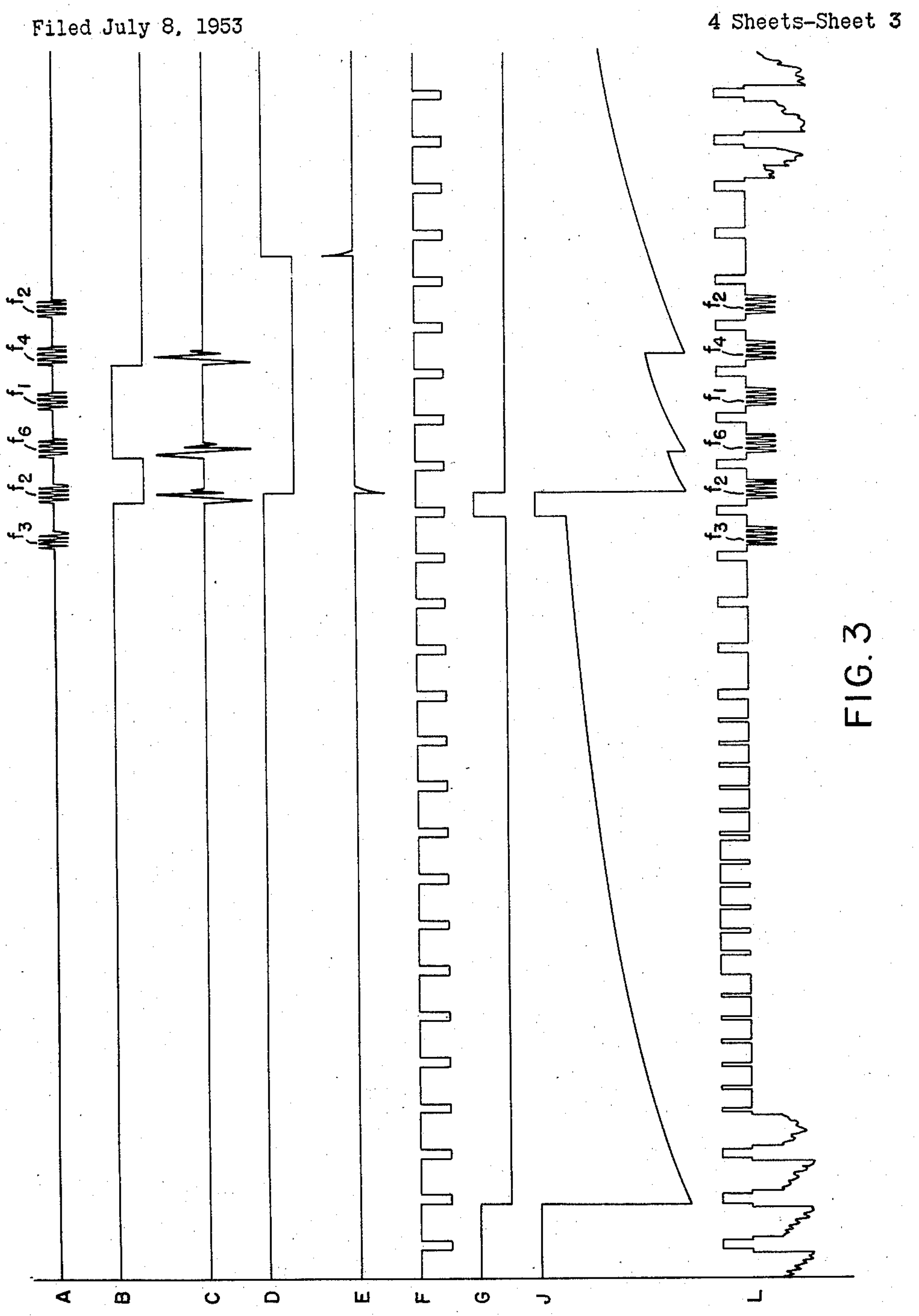
Figure 6:
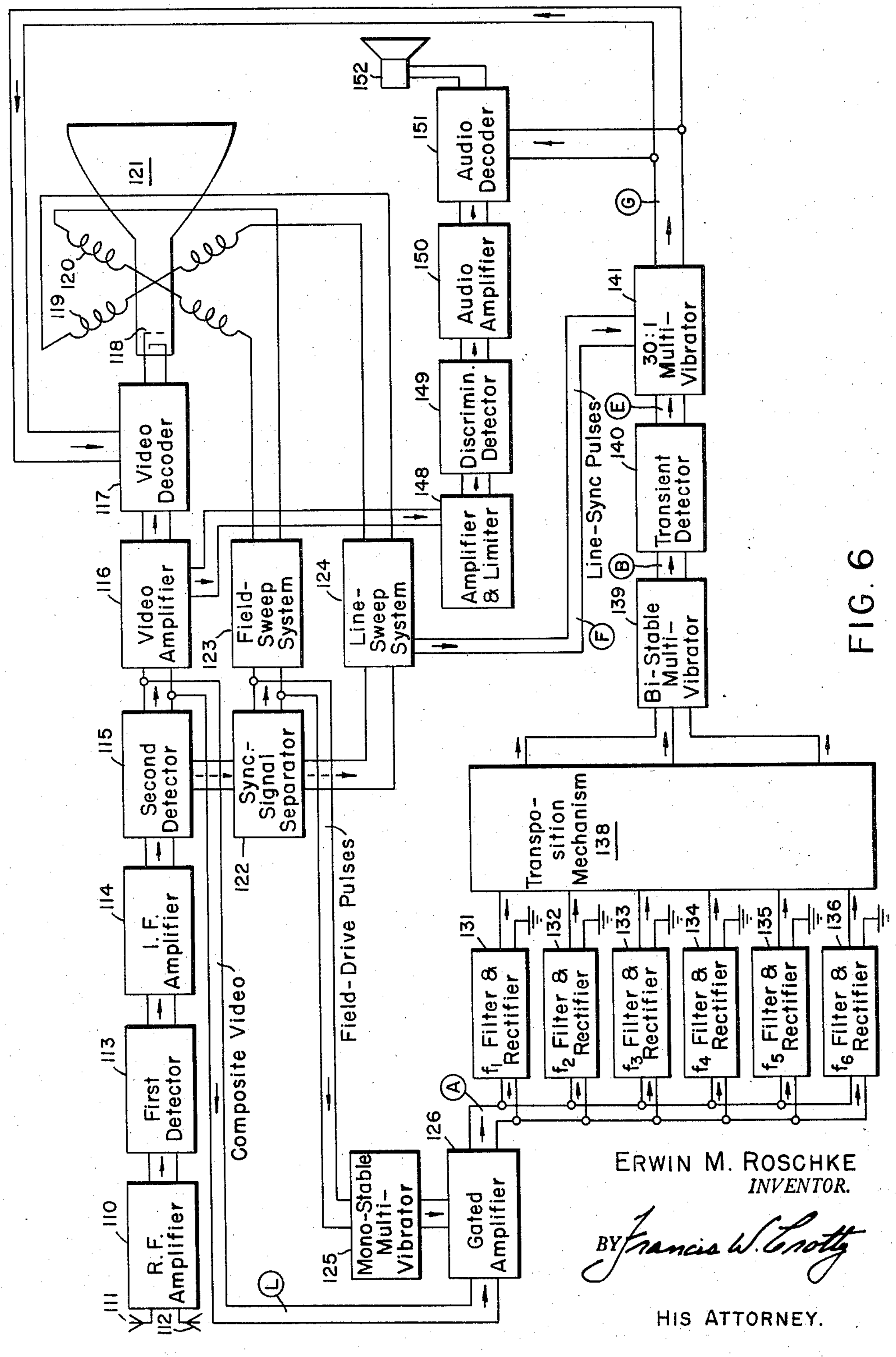

Figures 3 and 4 comprise a family of curves useful in explaining the operation of the system;

Figure 5 is a detailed schematic representation of a portion of the transmitter showing another embodiment of the invention; and Figure 6 represents a subscription television receiver for operation in conjunction with the transmitter of Figure 1.

The transmitter of Figure 1 includes a picture-converting device 10 which may be an iconoscope, image orthicon or other well-known type. The output terminals of device 10 are connected through a video amplifier 11 and a video coder 12 to the input terminals of a mixer amplifier 13. Video coder 12 may be similar to that disclosed and claimed in copending application Serial No. 243,039, filed August 22, 1951, and issued August 7, 1956, as Patent 2,758,153, in the name of Robert Adler, entitled "Subscription Television System," and assigned to the present assignee. It may comprise a beam-deflection tube having a pair of output circuits which may be selectively coupled into the video channel as the electron beam thereof is deflected from one to the other of two segmental anodes coupled to such output circuits. One of these circuits includes a time-delay network so that the timing of the video components relative to the synchronizing components of the radiated signal varies as the beam of the deflection tube is switched between its anodes. This switching effect is accomplished by means of a beam-deflection control or actuating signal applied to video coder 12, as explained hereinafter. Such intermittent variations in the relative timing of the video and synchronizing components effectively codes the television signal since conventional television receivers, not equipped with suitable decoding apparatus, depend upon an invariable time relation of the video and synchronizing components of a received signal to reproduce the image intelligence represented thereby.

Viewed from the standpoint of operating modes, video coder 12 has two stable operating conditions each of which imposes a different operating mode on the transmitter. In the first operating condition, coder 12 extends the video channel from amplifier 11 to mixer 13 without introducing any material delay and in this condition the transmitter operation is conventional particularly in respect of the time relative of the video and synchronizing components of the radiated signal. In its second operating condition, video coder 12 introduces a time delay in the video channel and the transmitter then functions in an abnormal mode since the video and synchronizing components of the radiated signal have an abnormal time relation with respect to one another.

Mixer amplifier 13 is connected through a direct-current inserter 14 to a video carrier-wave generator and modulator 15 which, in turn, is connected through a diplexer 16 to an antenna 17, 18. The transmitter also includes a synchronizing-signal generator 19 which supplies line- and field-synchronizing components and associated pedestal components to mixer 13 over leads 20. Generator 19 further supplies field- and line-drive pulses to a field-sweep system 21 and to a line-sweep system 22, respectively. The output terminals of sweep systems 21 and 22 are connected to the field-deflection elements 23 and line-deflection elements 24, respectively, associated with picture-converting device 10.

In order to add another measure of secrecy to the system, such as by coding the audio components as well as the video components, a microphone 28 is connected through an audio amplifier 29 to the input circuit of an audio coder 30. The output circuit of this audio coder is connected through an audio carrier-wave generator and modulator 31 to another input circuit of diplexer 16. Audio coder 30 may be similar to the beam-deflection device disclosed in the aforementioned Adler application and discussed hereinbefore in connection with the circuit of video coder 12 in that it may comprise a pair of deflection-control elements and a pair of collector or segmental anodes. The audio signal may be impressed on either one of the two segmented anodes in accordance with a coding schedule as the electron beam developed within the coder is switched back and forth under the control of a deflection signal applied to the deflection elements. A suitable phase inverting circuit may be coupled to the collector anodes to effect one type of sound coding so that the audio signal is phase inverted each time the electron beam is switched from one collector to the other. It will be made apparent hereinafter that the approximate frequency of the deflection control signal, namely 525 cycles per second, achieves very effective sound coding since phase inverting of signals in the audio spectrum at that rate completely eliminates intelligibility.

More specifically, one output terminal of audio amplifier 29 is grounded while the other is connected through a coupling condenser 32 to the intensity-control electrode 50 of a beam-deflection device 54, a grid-leak resistor 33 being connected between the intensity-control electrode and ground. Cathode 51 of tube 54 is connected to ground through a cathode bias resistor 34 which is shunted by a by-pass condenser 35. The two collector or target anodes 37, 38 of beam-deflection device 54 are connected respectively to the two input terminals of the primary winding 41 of a transformer 40. The center tap of primary winding 41 is connected to a source 39 of positive unidirectional potential. The secondary winding 42 of the transformer is coupled to the input terminals of audio carrier-wave generator and modulator 31 and is so wound in relation to primary winding 41 that the instantaneous phase of the audio signal appearing at the input circuit of unit 31 compared to the phase of the signal impressed on intensity-control electrode 50 is 180° out-of-phase when the electron beam of tube 54 is incident on one of the collector anodes while the same signal is translated to unit 31 in phase when the beam is incident on the other collector.

As mentioned briefly hereinbefore, very effective coding has been obtained by phase inverting the sound components at an approximate frequency of 525 cycles per second. However, inasmuch as such a beam-switching frequency falls in the audio spectrum a signal corresponding thereto would ordinarily be impressed across secondary winding 42 due to the quiescent or average beam current which is alternately translated through the two halves of the center-tapped primary winding 41, thereby contributing unwanted distortion to the sound components. To remedy this unfavorable condition, an auxiliary beam-switching device 55 is coupled to "buck" or "cancel out" the direct current translated through the two halves of the primary winding so that when the quiescent or average beam current in tube 54 is flowing through, for example, the top half of winding 41 a corresponding current is flowing through the bottom half to develop a flux field opposing that established by the current in the top half effectively to prevent the transfer of the low-frequency switching signal to audio carrier-wave generator and modulator 31.

Specifically, cathode 53 of auxiliary beam-switching device 55 is coupled to ground through a cathode biasing resistor 48 shunted by a by-pass condenser 49. Target or collector anodes 45 and 46 of device 55 are connected respectively to anodes 37 and 38 while deflection elements 44 and 47 are connected respectively to deflection elements 43 and 36 of tube 54. It will be noted that no intensity-modulation is provided in device 55, as is in device 54, since tube 55 only provides a constant, unvarying direct current equal to the quiescent current of beam-deflection device 54. To further explain, when the control potential impressed on deflection elements 43 and 36 is of such a polarity that the electron beam of tube 54 is directed to segmental anode 38, thereby causing a direct quiescent current flow from that anode through the lower half of winding 41 to source 39 at the center tap, the electron beam of device 55 is directed toward collector anode 45 to develop an equal and opposite direct-current flow through the top half of winding 41 to preclude the introduction of a low-frequency switching component into the audio signal. The described audio coding apparatus is disclosed and claimed in copending application Serial No. 587,600, filed May 28, 1956, in the name of Walter S. Druz, and assigned to the present assignee.

Generator 19 additionally supplies field-drive pulses to one input circuit of an encoding-signal generator 25 and line-drive pulses to another input circuit of the generator. Unit 25, which has one pair of output terminals connected over conductors 54 to synchronizing-signal generator 19 and another pair of output terminals connected over conductors 52 to a pair of input terminals of mixer amplifier 13 and over conductors 53 to a series of filter and rectifier units 61—66, is provided to develop during each of a series of spaced reset-time intervals, such as during each field-retrace period, a combination of encoding-signal components individually having a predetermined identifying characteristic such as frequency and collectively determining a coding schedule in accordance with their order within the combination. Such a generator is disclosed and claimed in copending application Serial No. 326,107, filed December 15, 1952, and issued Feb. 11, 1958 as Patent 2,823,252, in the name of Jack E. Bridges, entitled "Subscription Television System" and assigned to the present assignee, and thus is only shown in block diagram in the present case to avoid unduly encumbering the drawings.

In the illustrated embodiment, and as described in detail in the last-mentioned Bridges application, the encoding signal generated during each reset-time interval may comprise a series of six bursts of various signal frequencies, preferably randomly sequenced and randomly appearing within the interval. These bursts individually occur between the line-synchronizing pulses superimposed on the vertical-blanking pulse. These encoding-signal components are also applied over conductors 53 to the input circuits of frequency-selective filter and rectifier units 61—66 to facilitate their separation one from the other for selective application to a series of input circuits of a transposition mechanism 68. This mechanism, which is adjusted in accordance with a predetermined switch setting pattern, is provided for the purpose of selectively connecting any one of its input circuits and consequently frequency selective units 61—66 to any one of three output leads 55—57 and may comprise a family of toggle switches as shown in the aforementioned Bridges application or mechanism 68 may include a wafer switch arrangement as disclosed in copending application Serial No. 338,033, filed February 20, 1953, in the name of George V. Morris, entitled "Subscription Television Encoding Apparatus," now abandoned in favor of continuation-in-part application Serial No. 407,192, filed February 1, 1954, in the name of George V. Morris, and assigned to the present assignee.

Leads 55—57 are connected to the various input terminals of a multi-stable actuating device such as a bi-stable multivibrator 69. The various interconnections between mechanism 68 and multivibrator 69 are illustrated in detail in the aforementioned Bridges application. With them the encoding-signal components of any reset interval may be applied to the input circuits of multivibrator 69 in a controlled sequence to operate the multivibrator from one to another of its stable operating conditions. The output signal from the multivibrator consequently undergoes a series of amplitude excursions during each field-retrace interval at a randomly or irregularly timed rate. Thus, encoding signal generator 25, filter and rectifier units 61—66, transportation mechanism 68 and bi-stable multivibrator 69 may be considered to constitute means for developing during each of a series of spaced reset-time intervals, individually short relative to one of the field-trace intervals, a composite reset signal, namely the signal developed at the output terminals of multivibrator 69, having a characteristic that varies in accordance with a schedule represented by the combination of frequency bursts from generator 25.

The composite reset signal developed in multivibrator 69 is applied to a transient detector 70, which, in turn, is connected to one pair of input terminals of a control mechanism or 30:1 multivibrator 71, this multivbrator having another pair of input terminals connected to synchronizing-signal generator 19 to receive line-drive pulses therefrom. Detector 70, one embodiment of which is shown in Figure 2 and another is illustrated in Figure 4, is responsive to at least one selected variation of the composite reset signal developed by multivibrator 69 during each of the reset time intervals for developing a reset component.

Multivibrator 71 may be constructed in conventional manner such that it requires 30 applied line-drive pulses to execute a complete cycle of operations thereby to develop a square-wave control signal having an amplitude excursion in response to each sequence of 15 successive line-drive pulses. In other words, control or cycling mechanism 71 executes a sequence of operating steps to produce a control signal exhibiting a characteristic (amplitude) which periodically varies between at least two predetermined values upon the completion of each sequence. Transient detector 70 is coupled to control mechanism 71 in order to apply each of the reset components thereto for effecting actuation of that mechanism to a predetermined reference condition to modify the control signal otherwise developed therein.

The output terminals of cycling mechanism 71 are coupled over conductors 72 to the deflection elements of both video coder 12 and audio coder 30 to supply an actuating or deflection-control signal thereto. In view of the 30:1 division ratio of multivibrator 71 and the present R. T. M. A. scanning standards, the coding devices are operated at approximately 525 cycles per second.

In considering the operation of the described transmitter, the technique of coding will be disregarded initially. Picture-converting device 10 produces video frequency components representing the program information to be televised and these components, after amplification in amplifier 11, are supplied through video coder 12 to mixer amplifier 13. The mixer also receives the usual line- and field-synchronizing and blanking pulses from generator 19 so that a composite television signal is developed therein. That signal is adjusted as to proper background level in direct-current inserter 14 and is amplitude modulated on a picture carrier in unit 15. The modulated video carrier is supplied through diplexer 16 to antenna 17, 18 for transmission to subscriber receivers. It will, of course, be understood that in the generation of the video frequency components sweep systems 21 and 22 are synchronized by the field- and line-drive pulses applied thereto by generator 19.

At the same time, the audio information accompanying the video information is picked up by microphone 28 and supplied through amplifier 29 and audio coder 30 to audio carrier-wave generator and modulator 31. In unit 31 the audio information, according to present practice, is frequency modulated on a sound carrier which modulated carrier is applied through diplexer 16 to antenna 17, 18 from which it is concurrently radiated with the modulated video signal.

It is necessary in any commercial subscription system to code the video signal, and preferably the sound signal as well, to prevent pirating or unauthorized use of the program material. Briefly, coding of the video portion of the broadcast is accomplished by video coder 12 under the influence of a deflection-control signal which switches the beam thereof back and forth between its two segmental or collector anodes in accordance with a coding schedule represented by the amplitude variations of that signal. Simultaneously, coding of the audio portion of the television signal is achieved by coder 30 under the influence of the same deflection-control signal which likewise switches the beam thereof from one anode to another in accordance with the coding schedule. As previously explained, this actuation of the coding device varies the operating mode of the transmitter; it modifies the time relation of the video and synchronizing components of the radiated signal, phase inverts the audio signal, and thereby achieves coding. Consideration will now be given to the particular manner in which the telecast is coded in accordance with the illustrated embodiment of the invention.

Encoding-signal generator 25 may develop during any one particular field-retrace interval a series of encoding-signal components shown in curve A of Figure 3. These components are applied to filter and rectifier units 61—66 wherein they are separated from one another for individual application to the various input circuits of transposition mechanism 68. The transposition mechanism establishes prescribed circuit conditions between its input circuits and the input circuits of bi-stable multivibrator 69 so that the multivibrator is triggered between its stable operating conditions in accordance with the application of the encoding-signal components to its various input circuits, which in turn is dependent on the particular switch setting pattern of mechanism 68 as well as the order and appearance of the individual components within the encoding signal combination. Assume for purposes of illustration that the encoding-signal components are so channeled to multivibrator 69 that a typical signal such as that shown in curve B is developed at its output terminals and supplied to transient detector 70. That is, the signal burst $f_3$ has no effect at this instant on the multivibrator; the next signal burst $f_2$ trips the multivibrator; the following signal burst $f_6$ trips it again; the burst $f_1$ is ineffective; burst $f_4$ trips it again and the last burst of this particular combination presented during the field-retrace interval under consideration is ineffective. The signal resulting from the response of the multivibrator to this assumed combination of frequency bursts originating in generator 25 is shown in curve B and is referred to as a composite reset signal.

Referring now to the transient detector shown in Figure 2 for developing a reset component in response to at least one selected amplitude variation of the composite reset signal of curve 3B, it comprises an input transformer 80 having a primary winding 81 connected to the output terminals of multivibrator 69 and a secondary winding 82 coupled to the input terminals of a conventional mono-stable multivibrator 85. A condenser 83 and a damping resistor 84 are connected across secondary winding 82 to constitute in conjunction with winding 82 an oscillating tank or ringing circuit which develops a highly damped transient signal, as shown in curve 3C, in response to each amplitude variation of the composite reset signal of curve 3B. This damped transient developed by shocked excitation of the ringing circuit is applied to the input terminals of multivibrator 85. The first positive peak of the signal of curve 3C corresponds to the first amplitude excursion of the composite reset signal and actuates multivibrator 85 from its normal operating condition to its abnormal operating condition. The multivibrator automatically restores to its normal condition after a selected time interval determined by its internal cycling circuits and thereby produces the pulse of curve D. The parameters of multivibrator 85 are so chosen that the trailing edge of this pulse always occurs, in point of time, subsequent to the final encoding-signal component of the combination of pulses (curve 3A) presented by generator 25 in any field-retrace interval. Hence, the multivibrator produces a single pulse only in any field-retrace period and the timing of its leading edge is determined by the first amplitude excursion of the composite reset signal (curve 3B) developed in the same retrace period.

The pulse of curve 3D is impressed across a differentiating circuit comprising a condenser 86 and a shunt resistor 87 to develop across the resistor the differentiated wave shape of curve 3E. The signal of curve 3E is impressed on multivibrator 71 which is arranged in known manner to respond to a reset pulse of negative polarity (the leading pulse of curve 3E) to assume a reference operating condition. Of course, as is well understood, this reference state is merely a chosen one of the two stable operating conditions of the multivibrator and if the circuit is in that condition upon receipt of the reset pulse, the pulse is ineffective. On the other hand if the circuit is instantaneously in its other operating condition, the reset pulse is effective and interrupts the operating sequence of the multivibrator and initiates another sequence thereby modifying the control signal that would otherwise be developed by multivibrator 71.

The operation of multivibrator 71 may be further explained by referring particularly to curves E, F and G of Figure 3. Curve 3F denotes a series of line-drive pulses supplied to multivibrator 71 to be counted thereby and curve 3G illustrates the signal appearing at the output terminals of the multivibrator considered as a counter. The second amplitude excursion of curve 3G (starting from the left side of the drawing) occurs 15 line traces later than the first, indicating the normal flip-flop action after each half cycle of operation of a 30:1 counter. Before the next succeeding series of 15 line pulses has been received to flip counter 71 as in the normal course of events, the reset pulse (the negative pulse of curve 3E) triggers the mechanism back to its reference condition in which the output signal assumes its negative or minimum amplitude level. As already stated, the reset component may occur when multivibrator 71 is in its reference condition in which case the reset is not effective and the count proceeds uninterruptedly.

The time position of the negative-polarity reset pulse of curve 3E within any field-retrace interval is determined by the first amplitude variation of the composite reset signal of curve 3B. And this first amplitude excursion may occur in response to any one of the six encoding-signal components of curve 3A, or for that matter, in some field-retrace intervals it may not occur at all in which case no reset component is developed.

To further illustrate, assume that the wave form of curve 4B′ is developed in multivibrator 69 instead of that shown in curve 3B. It should be mentioned at this time that in order to maintain the correct time relationship between the curves of Figures 3 and 4, Figure 4 should be placed immediately below Figure 3. With an examination of curves 4B′ and 3A it will be noted that the first two signal bursts of curve 3A, namely $f_3$ and $f_2$, have no effect on the multivibrators so the first amplitude excursion of the composite reset signal of curve 4B′, does not occur until the receipt of the $f_6$ signal burst. Thus, as revealed by curves 4C′, 4D′, and 4E′, which correspond to curves 3C, 3D and 3E respectively, transient detector 70 produces the negative pulse of curve 4E′, to trigger multivibrator 71 to its reference condition and this pulse occurs in response to the third occurring signal burst of curve 3A rather than the second signal burst ($f_2$) as is the case with curve 3B. The waveform of curve 3E has been reproduced on Figure 4 in order to conveniently illustrate the variation in the time positioning of the reset pulse effected by the different composite reset signal. Thus, the system provides means for resetting cycling mechanism 71 to a reference condition during any selected one of a plurality of different predetermined time intervals within a field-retrace period.

As a further variant of the invention, the embodiment illustrated in Figure 5 may be employed to select a different amplitude variation of the composite reset signal for reset purposes. Specifically, this embodiment may comprise a "last-transient" detector to reset the control mechanism in accordance with the last amplitude excursion of the signal of curve 3B rather than the first as in the case previously described. The composite reset signal is applied by means of the primary winding 88 of an input transformer 90 to a parallel resonant tank circuit comprising a secondary winding 89, a condenser 91 and a damping resistor 92. This tank or ringing circuit develops a series of highly damped transient signals (curve 3C) in response to each amplitude variation of the composite reset signal. The signal of curve 3C is applied to the control electrode 93 of an electron-discharge device 102. The cathode 95 of this device is connected to ground through a resistor 96 shunted by a by-pass condenser 97. The junction of cathode 95 and resistor 96 is connected to a source 99 of positive unidirectional potential through a resistor 98, the potentiometer arrangement of resistors 96 and 98 being such that cathode 95 is established at a predetermined positive potential. The anode 94 of device 102 is connected to a discharge condenser 101 of control mechanism 71, shown in detail in Figure 4.

With reference now to curve J of Figure 3, which illustrates the charging wave-form of condenser 101, and particularly to the left half of that curve, it will be noted that ordinarily the application of 15 line-drive pulses (curve 3F) are required before multivibrator 71 is actuated from one to the other of its operating conditions. However, once the multivibrator has assumed that other condition instead of remaining for the next succeeding series of 15 line-drive pulses, the first positive peak of the signal of curve 3C "gates open" device 102 to effect the immediate discharge of condenser 101 and to thus switch operating conditions. As curve 3J reveals, the second, third and remaining positive peaks of the signal of curve 3C also effect a discharge of condenser 101 so that multivibrator 71 can not count the required 15 line-drive pulses until after the last positive peak of the signal of curve 3C, or subsequent to the last amplitude variation of the composite reset signal of curve 3B rather than 15 line traces subsequent to the first amplitude excursion of this signal as with the embodiment of Figure 2.

In order that subscriber receivers may utilize the coded transmission, it is necessary that the combination of encoding-signal components developed by generator 25 be made known to them. To that end, the encoding signal combination (curve 3A) is applied to mixer amplifier 13 over conductors 52 at the same time it is delivered to transportation mechanism 68 to be combined with the composite video signal for transmission to subscriber receivers. The bursts of various signal frequencies, which constitute the encoding signal, occur between the line-drive pulses superimposed on the vertical-blanking pulse, and therefore it is desirable that the amplitude level of the blanking pulse be modified to effect an inward modulation of the blanking pulse by the encoding-signal components. To that end, appropriate pulses are supplied to synchronizing signal generator 19 over conductors 54 to produce suitable modulating pulses which, in turn, are supplied to mixer amplifier 13 over conductors 20 to downward modulate the vertical-blanking pulses at the appropriate times. The effect of the application of these modulating pulses and the encoding-signal components to the mixer amplifier 13 is readily apparent by observing the wave-form of the radiated composite video signal shown in curve L.

It is, of course, evident that the utilization of the video channel to convey coding information is immaterial to the inventive concept and that such information may be distributed in whole or in part in other manners as for example, in the form of auxiliary modulation of the sound carrier or a completely separate carrier or by means of a line circuit extending from the transmitter to a subscriber receiver. It should also be apparent that the entire encoding signal may be developed locally at each subscriber receiver by means of a coding device such as a code disc or code card.

The receiver of Figure 6, which may utilize the telecast originating at the transmitter of Figure 1, comprises a radio-frequency amplifier 110 having input terminals connected to an antenna circuit 111, 112 and output terminals connected to a first detector 113, the output terminals of the detector being connected to an intermediate-frequency amplifier 114. The output terminals of the intermediate-frequency amplifier are connected through a second detector 115 to a video amplifier 116 which, in turn, is coupled through a video decoder 117 to the input electrodes 118 of a cathode-ray image-reproducing device 121. Video decoder 117 may be similar to video coder 12 at the transmitter except that it is controlled to operate in a complementary fashion in order effectively to compensate for the variations in the timing of the received television signal. Video amplifier 116 is also connected to an amplifier and amplitude limiter 148 which, in turn, is coupled through a discriminator detector 149 to an audio amplifier 150. The output terminals of amplifier 150 are connected through an audio decoder 151 to a speaker 152. Decoder 151 may be identical in construction to coder 30 at the transmitter so that when actuated by a corresponding control signal it effects compensating phase inversions of the audio signal in time coincidence with such inversions at the transmitter.

Second detector 115 is also coupled through a synchronizing-signal separator 122 to a field-sweep system 123 and to a line-sweep system 124. The output terminals of sweep systems 123 and 124 are connected respectively to field-deflection elements 120 and line-deflection elements 119, associated with reproducing device 121.

In order to facilitate the separation of the encoding-signal components from the composite television signal, it is desired to provide circuitry which will "gate in" only that portion of the composite signal containing such components. To that end, field-drive pulses are derived from synchronizing-signal separator 122 and supplied to a mono-stable multivibrator 125 having output terminals connected to a normally-closed gated amplifier 126. The output terminals of second detector 115 are also connected to gated amplifier 126 to supply the composite video signal thereto, and the output circuit of this amplifier is connected to the input circuits of each one of a series of filter and rectifier units 131—136 corresponding to units 61—66 at the transmitter.

The output circuits of rectifiers 131—136 are connected to the input terminals of a transportation mechanism 138 which is preferably similar to mechanism 68 at the transmitter. Transposer 138 has three output circuits connected to respective input circuits of a bi-stable multivibrator 139, which is similar to multivibrator 69, and is likewise provided for the purpose of selectively connecting any one of the output circuits from filter and rectifier units 131—136 to any of the input circuits of bi-stable multivibrator 139. If the various interconnections established by mechanism 138 are identical to the interconnections established by similar transposition mechanism 68 at the transmitter, decoding is effected. The mechanism setting information is disseminated only to authorized subscibers and a suitable charge may, of course, be assessed for such information.

The output terminals of bi-stable multivibrator 139 are connected to a transient detector 140 and the output terminals of the detector are connected to one pair of input terminals of a control or cycling mechanism or 30:1 multivibrator 141. This multivibrator has another pair of input terminals connected to line-sweep system 124 to receive line-synchronizing pulses therefrom and has its output terminals connected to audio decoder 151 and video decoder 117 to provide an actuating or deflection-control signal therefor. The decoding arrangement shown in Figure 5 comprising bi-stable multivibrator 139, transient detector 140 and multivibrator 141 is identical to the corresponding arrangement in Figure 1.

In operation of the receiver, the coded television signal is intercepted by antenna circuit 111, 112, amplified in radio-frequency amplifier 110 and heterodyned to the selected intermediate frequency of the receiver in first detector 113. The resulting intermediate-frequency signal is amplified in intermediate-frequency amplifier 114 and detected in second detector 115 to produce a composite video signal. This latter signal is amplified in video amplifier 116, translated through video decoder 117, and impressed on the input electrodes 118 of image-reproducing device 121 to control the intensity of the cathode-ray beam of the device in well-known manner. An intercarrier-sound signal is separated in video amplifier 116 in accordance with intercarrier sound principles and is amplified and amplitude limited in unit 148 and detected in discriminator detector 149. The audio signal components are amplified in amplifier 150 and translated through audio decoder 151 to speaker 152 wherein the sound intelligence is reproduced.

The synchronizing components are separated in separator 122, the field-synchronizing components being utilized to synchronize sweep system 123 and, hence, the field scansion of image-reproducing device 121; whereas the line-synchronizing components are utilized to synchronize sweep system 124 and, therefore, the line scansion of device 121.

Field-drive pulses from separator 122 are supplied to mono-stable multivibrator 125 to produce a gating pulse for normally-close gated amplifier 126. The parameters of the multivibrator are so chosen that the gating pulse overlaps in point of time that portion of the field-retrace interval of the composite video signal (curve L) which includes the encoding-signal components. The composite video signal is continuously applied to the input circuit of amplifier 126, but only the information contained during the interval of the gating pulse is translated to filter and rectifier units 131–136. Amplifier 126 is thus "opened" during the times the signal bursts of various frequencies, representing the combination of encoding-signal components, are received and since units 131–136 are individually tuned to an assigned one of these frequencies, such bursts are separated out from the composite video signal and from each other. Each time a burst of signal frequency occurs in the encoding signal combination, it is channeled over a corresponding input circuit of transposition mechanism 138 to one of the input circuits of bi-stable multivibrator 139 for selective application thereto.

If the various switch elements of transposer 138 are adjusted to the same setting as the corresponding transposition mechanism at the transmitter, the input circuits of bi-stable multivibrator 139 receive pulses similar to those received by the input circuits of multivibrator 69 at the transmitter. Multivibrator 139 therefore produces a composite reset signal (curve 3B) for application to transient detector 140 which is identical in wave form to that developed at the transmitter for application to its detector.

Either the first or last amplitude variation of the composite reset signal is selected in detector 140, depending on whether the embodiment of Figure 2 or Figure 5 is employed in the system, to reset control mechanism 141 so that the signal resulting from that mechanism undergoes amplitude excursions in exact synchronism with the output signal of multivibrator 71 at the transmitter. The control signal thereby developed in multivibrator 141 is applied to audio decoder 151 and video decoder 117 to effect actuation thereof in time coincidence with the actuation of similar coders 30 and 12 at the transmitter so that the video components applied to the input electrodes of image-reproducing device 121 are suitably compensated to effect intelligible image reproduction and also so that the phase of the audio signal is properly inverted to decode the sound components.

The invention provides, therefore, an improved subscription television system wherein a periodically varying control signal for an encoding device is altered at spaced time intervals, and preferably in accordance with a randomly varying schedule, to develop a highly complex mode change pattern.

Certain features described in the present application are disclosed and claimed in copending applications Serial No. 281,418, filed April 9, 1952, in the name of George V. Morris et al., and Serial No. 700,855, filed December 5, 1957, in the name of Jacob M. Sacks, both of which are assigned to the present assignee.

While particular embodiments of the invention have been shown and described, modifications may be made, and it is intended in the appended claims to cover all such modifications as may fall within the true spirit and scope of the invention.

I claim:

1. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified signal.

2. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting an amplitude characteristic which periodically varies upon the completion of each sequence as between at least two predetermined values; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

3. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting an amplitude characteristic which periodically varies upon the completion of each sequence as between at least two predetermined values; means for developing during each of a series of spaced reset-time intervals, each short relative to one of said field-trace intervals, a composite reset signal having an amplitude characteristic that varies in accordance with a predetermined schedule; means responsive to at least one selected amplitude variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

4. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values; means for developing during each of a series of periodically recurring reset-time intervals, each short relative to one of said field-trace intervals, a composite reset signal having a characteristic that varies in accordance with a random schedule; means responsive to at least one selected variation of said composite reset signal during each of said reset-time intervals for developing a series of randomly occurring reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

5. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values; means for developing during each of said field-retrace intervals a composite reset signal having a characteristic that varies in accordance with a predetermined schedule; means responsive to at least one selected variation of said composite reset signal during each of said field-retrace intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

6. In a subscription television system for translating a television signal comprising a series of field-trace intervals recurring at a predetermined field-scanning frequency: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values and at a rate faster than said field-scanning frequency; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

7. In a subscription television system for translating a television signal, including video and audio components, comprising periodically recurring field-trace intervals and intervening field-retrace intervals: a first encoding device having at least two operating conditions each of which establishes a predetermined operating mode in said system effectively to encode said video components; a second encoding device having at least two operating conditions each of which establishes a predetermined operating mode in said system effectively to encode said audio components; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said first and second encoding device to effect actuation of said devices in accordance with said modified control signal.

8. In a subscription television system for translating a television signal: encoding apparatus having at least two operating conditions each of which establishes a predetermined operating mode in said system effectively to encode said television signal; a cycling mechanism for continuously developing a periodic control signal; means for developing during each of a series of reset-time intervals a composite reset signal having characteristic variations in accordance with a predetermined schedule; means responsive to certain ones of said characteristic variations of said composite reset signal for developing reset components related to said schedule; means coupled to said last-mentioned means and to said cycling mechanism for applying said reset components to said cycling mechanism to modify a characteristic of said control signal in accordance with said schedule; and means for applying said modified control signal to effect actuation of said encoding apparatus.

9. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having characteristic variations occurring at various times within the reset-time interval in accordance with a predetermined schedule; means responsive solely to the first characteristic variation of said composite reset signal during each of said rest-time intervals for developing a series of reset components; means for applying each of said reset components of said cycling mechanism to effect actuation thereof to a predetermined reference condition thereby modifying said control signal; and means coupling said cycling mechanism to said encoding device to effect actuation of said device in accordance with said modified control signal.

10. In a subscription television system for translating a television signal comprising periodically recurring field-trace intervals and intervening field-retrace intervals: an encoding device having at least two operating conditions each of which establishes a predetermined operating mode in said system effectively to encode said television signal; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having characteristic variations occurring at various times within the reset-time interval in accordance with a predetermined schedule; means responsive to the last characteristic variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said encoding device to effect actuation of said device in accordance with said modified control signal.

11. In a subscription television system for translating a television signal comprising periodically recurring field-trace intervals and further having intervening line-synchronizing components; an encoding device having at least two operating conditions each of which establishes a predetermined operating mode in said system effectively to encode said television signal; a pulse-counting mechanism coupled to said encoding device and responsive to the application of a predetermined number of input pulses to effect an actuation of said encoding device from one to another of its aforesaid operating conditions; a pulse-signal source for supplying to said counting mechanism a series of input pulses timed to said synchronizing components; means for developing during each of a series of spaced reset-time intervals, each short relative to one of said field-trace intervals, a composite reset signal having a characteristic that varies in accordance with a predetermined schedule; means responsive to a least one selected variation of said composite reset signal during each of said reset-time intervals for developing a series of reset components; means for applying each of said reset components to said pulse-counting mechanism to effect actuation thereof to a predetermined reference condition thereby modifying said control signal; and means coupling said pulse-counting mechanism to said encoding device to effect actuation of said device in accordance with said modified control signal.

12. In a subscription television system for translating a television signal, including video and audio components, having a series of field-trace intervals and a corresponding series of intervening field-retrace intervals recurring at a predetermined field-scanning frequency and further having intervening line-synchronizing components; a first encoding device having at least two operating conditions each of which establishes a predetermined operating mode in said system effectively to encode said video components; a second encoding device having at least two operating conditions each of which establishes a predetermined operating mode in said system effectively to encode said audio components; a counting mechanism responsive to the application of a predetermined number of input pulses for executing a sequence of operating steps to produce a control signal exhibiting an amplitude characteristic which periodically varies upon the completion of each sequence as between at least two predetermined values and at a rate faster than said field-scanning frequency; a pulse-signal source for supplying to said counting mechanism a series of input pulses individually corresponding to one of said line-synchronizing components; means for developing during each of said field retrace intervals a composite reset signal having an amplitude characteristic that varies in accordance with a predetermined schedule; means responsive to at least one selected amplitude variation of said composite reset signal during each of said field-retrace intervals for developing a series of randomly occurring reset components; means for applying each of said reset components to said counting mechanism to effect actuation thereof to a predetermined reference condition thereby modifying said control signal; and means coupling said counting mechanism to said first and second encoding devices to effect actuation of said devices in accordance with said modified control signal.

13. In a subscription television transmitter for transmitting a television signal comprising periodically recurring field-trace intervals and intervening field-retrace intervals: a coding device having at least two operating conditions each of which establishes a predetermined operating mode in said transmitter effectively to code said television signal; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said coding device to effect actuation of said device in accordance with said modified control signal.

14. In a subscription television transmitter for transmitting a television signal comprising periodically recurring field-trace intervals and further having intervening line-synchronizing components; a coding device having at least two operating conditions each of which establishes a predetermined operating mode in said transmitter effectively to code said television signal; a pulse-counting mechanism coupled to said coding device and responsive to the application of a predetermined number of input pulses to effect an actuation of said coding device from one to another of its aforesaid operating conditions; a pulse-signal source for supplying to said counting mechanism a series of input pulses timed to said synchronizing components; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said pulse-counting mechanism to effect actuation thereof to a predetermined reference condition thereby modifying said control signal; and means coupling said pulse-counting mechanism to said coding device to effect actuation of said device in accordance with said modified control signal.

15. In a subscription television receiver for utilizing a television signal comprising periodically recurring field-trace intervals and intervening field-retrace intervals: a decoding device having at least two operating conditions each of which establishes a predetermined operating mode in said receiver effectively to decode said television signal; a cycling mechanism having a sequence of operating steps for producing a control signal exhibiting a characteristic which periodically varies upon the completion of each sequence as between at least two predetermined values; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said cycling mechanism to effect actuation thereof to a predetermined reference condition thereby modifying said control signal; and means coupling said cycling mechanism to said decoding device to effect actuation of said device in accordance with said modified control signal.

16. In a subscription television receiver for utilizing a television signal comprising periodically recurring field-trace intervals and further having intervening line-synchronizing components; a decoding device having at least two operating conditions each of which establishes a predetermined operating mode in said receiver effectively to decode said television signal; a pulse-counting mechanism coupled to said decoding device and responsive to the application of a predetermined number of input pulses to effect an actuation of said decoding device from one to another of its aforesaid operating conditions; a pulse-signal source for supplying to said counting mechanism a series of input pulses timed to said synchronizing components; means for developing during each of a series of spaced reset-time intervals, each short relative to one of said field-trace intervals, a composite reset signal having a characteristic that varies in accordance with a predetermined schedule; means responsive to at least one selected variation of said composite reset signal during each of said reset-time intervals for developing a series of reset components; means for applying each of said reset components to said pulse-counting mechanism to effect actuation thereof to a predetermined reference condition thereby modifying said control signal; and means coupling said pulse-counting mechanism to said decoding device to effect actuation of said device in accordance with said modified control signal.

References Cited in the file of this patent

UNITED STATES PATENTS

| | | |
|---|---|---|
| 2,472,774 | Mayle | June 7, 1949 |
| 2,547,598 | Roschke | Apr. 3, 1951 |
| 2,551,068 | Striker | May 1, 1951 |
| 2,570,188 | Aram et al. | Oct. 9, 1951 |
| 2,573,349 | Miller et al. | Oct. 30, 1951 |
| 2,656,405 | Roschke et al. | Oct. 20, 1953 |
| 2,656,406 | Gray et al. | Oct. 20, 1953 |
| 2,656,407 | Herrick et al. | Oct. 20, 1953 |
| 2,664,460 | Roschke | Dec. 29, 1953 |
| 2,678,347 | Clothier | May 11, 1954 |